United States Patent [19]
Pelak et al.

[11] 3,908,439
[45] Sept. 30, 1975

[54] FLAT BOTTOM REFERENCE REFLECTORS FOR ULTRASONIC INSPECTION

[75] Inventors: Andrew Pelak, Garfield; Fred H. Michelsohn, Wyckoff, both of N.J.

[73] Assignee: Curtiss-Wright Corporation, Wood Ridge, N.J.

[22] Filed: Sept. 24, 1974

[21] Appl. No.: 508,770

[52] U.S. Cl. .................................................. 73/1 R
[51] Int. Cl.² ........................................ G01L 25/00
[58] Field of Search ................. 73/1 R, 1 DV, 67.8; 33/144

[56] References Cited
UNITED STATES PATENTS
3,677,061  7/1972  Visser .................................. 73/1 R Primary Examiner—Donald O. Woodiel
Attorney, Agent, or Firm—Victor D. Behn; Arthur Frederick

[57] ABSTRACT

A set of test blocks of different lengths and tapered at one end to different size reflecting surfaces for use in calibrating ultrasonic flaw detection test equipment.

5 Claims, 5 Drawing Figures

FLAT BOTTOM REFERENCE REFLECTORS FOR ULTRASONIC INSPECTION

BACKGROUND OF THE INVENTION

The use of ultrasonic equipment for detecting flaws in metal parts as well as certain non-metallic parts is quite common. When pulsed ultrasonic sound waves generated by a transducer are transmitted into a part to be inspected, any internal defect or flaw (as for example, a crack, voids or other discontinuity) in the part will cause a portion of the sound waves impinging on the defect to be reflected back toward the transducer or other receiver. The time interval between the transmission of the sound pulse into the body and when the pulse is reflected from the defect reaches the transducer, is a measure of the distance between the point where the sound waves enter or leave the body and the location of the defect. In addition, the magnitude of this reflected pulse is a measure of the size of the defect as viewed in the direction of travel of the sound waves.

In the past, such ultrasonic test equipment was calibrated by using test blocks in which holes were drilled to different depths from one surface of each block to form surfaces at the bottom holes which reflect sound waves entering the block from the opposite end of the block. Such prior art blocks usually consist of a group of blocks having holes of one diameter and other groups of blocks having holes of another diameter with the holes of each group being of different depths. The ultrasonic test equipment is calibrated by transmitting sound pulses into each of these blocks. In this way the data obtained from the calibration blocks can be used to determine the size of flaws and the depths of flaws within material being tested by the equipment.

Difficulty has been experienced with such prior calibration test blocks in drilling the holes in each of these blocks so as to provide a surface at the bottom of each hole which not only is parallel to the surface of the block from which the ultrasonic sound beam is transmitted into the block but also is truly flat so as to provide a reflecting surface of the desired area facing the path of travel of the sound beam. In addition, with such prior calibration blocks it is difficult to obtain the same surface finish at the bottom surface of each hole in order that these surfaces have essentially the same reflective characteristics to sound beams.

SUMMARY

It is an object of the invention to provide novel and improved means for calibrating ultrasonic flaw detection testing equipment. More specifically, it is an object of the invention to provide a set of calibration blocks each having a relatively large surface at one end and being tapered at the other end to provide a small reflecting surface. These two surfaces of each block can readily be made flat and are parallel to each other. In addition, the surface finish of the small end reflecting surfaces of the calibration blocks can readily be controlled to a degree impossible with the prior art blocks in which these reflecting surfaces are formed at the bottom of holes in the blocks.

The blocks are used in sets with each set consisting of a number of blocks of different lengths with the same diameter reflecting surfaces at one end. Preferably, each set consists of at least three blocks of different lengths but having small end reflecting surfaces of the same diameter. A set of such blocks also may include at least two such groups of three or more blocks each with the small end reflecting surfaces being of a different diameter from the small end reflecting surfaces of the other group or groups of such blocks.

The test blocks are used to calibrate the flaw detection test equipment by using the transducer of the ultrasonic flaw detecting equipment to transmit an ultrasonic sound beam through each of the blocks from their large end. This sound beam is reflected by the small reflecting end of the block and the time of arrival and the amplitude of the reflected pulse returning to the transducer is recorded. The data so obtained is compared with the reflected pulse recorded by the equipment when it is used to detect flaws in a body being inspected whereby the size and location of the flaws can be determined. It is preferable that the calibration blocks and the body which is to be inspected by the ultrasonic flaw detection equipment be of the same material. This is not absolutely essential, however. If they are of different material, having different velocity of sound transmission and different sound attenuation properties, these differences can be taken into account in calibration of the ultrasonic test equipment when used to inspect such a body for flaws.

Other objects of the invention will become apparent when reading the detailed description in connection with the drawings.

Figure 1:
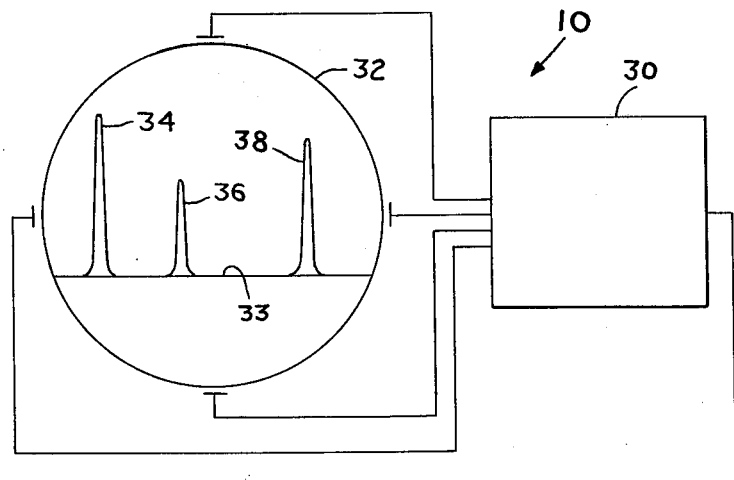
FIG. 1 is a schematic view of conventional ultrasonic flaw detection equipment being used for detecting flaws in a body.
Figure 1:
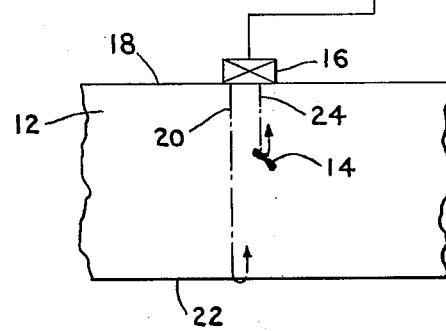

Referring first to FIG. 1 of the drawing, there is illustrated conventional ultrasonic flaw detection test equipment 10 for non-destructive inspection of a body 12 for detecting flaws such as 14 in said body. The test equipment includes a transducer 16 which utilizes a piezoelectric crystal (not shown), or equivalent device, for converting electric energy into ultrasonic energy and for introducing a beam of this ultrasonic energy into a body 12 through its surface 18. A portion of this ultrasonic energy is immediately reflected back from the surface 18 to the transducer 16 which also functions as a receiver to convert this reflected sound signal back to an electric energy signal. In general, a major portion of the sound beam entering the body 12 travels through the body 12 as indicated at 20 to its opposite surface 22 where it is reflected back toward the transducer which converts the reflected sound back to an electric signal. In addition, where the body 12 has a flaw 14 in the path of the sound beam, a portion 24 of the sound beam is reflected back toward the transducer 16 by the flaw 14 where this reflected beam is also converted to an electric signal.

The flaw detecting equipment 10 includes the usual electric circuitry schematically indicated by the box 30 for supplying electric energy to the transducer 16 and also for amplifying and routing the reflected signals to an oscilloscope or cathode ray tube 32 for displaying the reflected signals. The reflected signals are indicated on the screen of the cathode ray tube 32 as pulses or pips on a time or distance axis 33. Thus, the pulses 34, 36 and 38 indicate the reflected sound beam signals from the surface 18, the flaw 14 and the surface 22, respectively. The structure of the ultrasonic flaw detecting equipment described is quite conventional.

Figure 2:
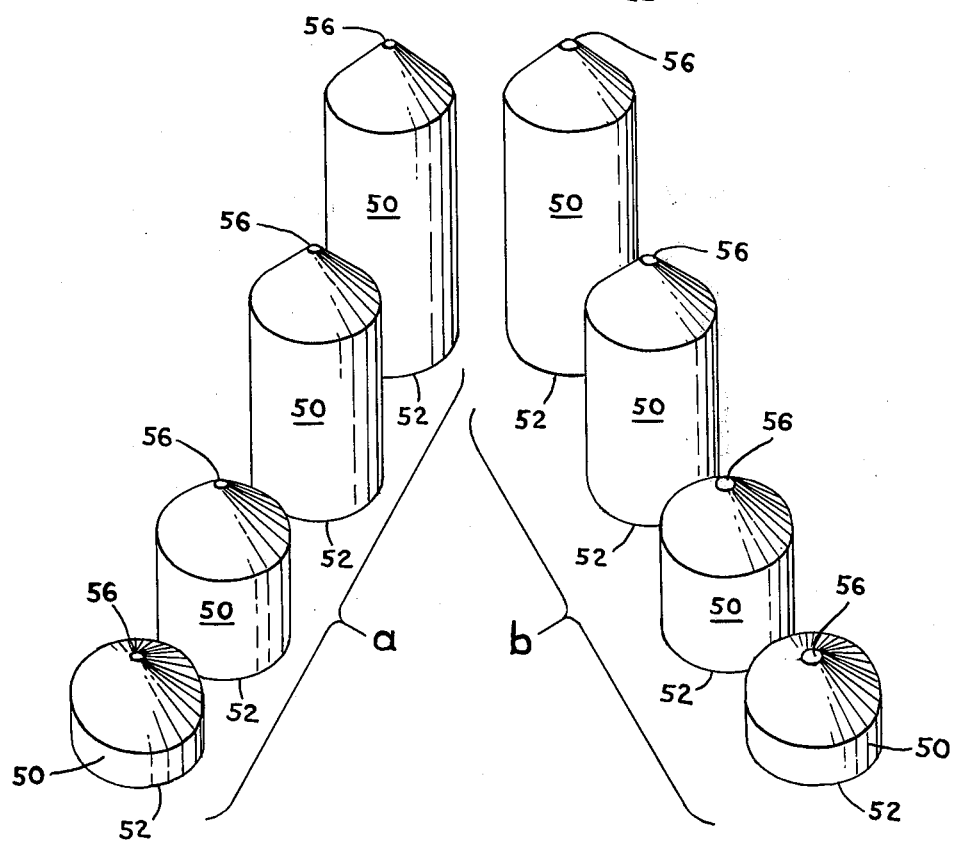
FIG. 2 is a perspective view illustrating a set of blocks embodying the invention for calibrating such flaw detection equipment.
Figure 3:
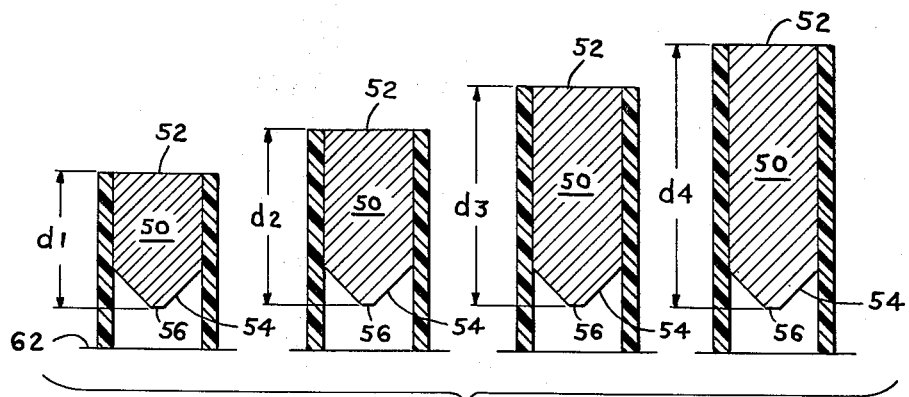
FIG. 3 is a view showing a group of calibration blocks with their supporting sleeves.

Referring now to FIGS. 2 and 3, there is shown a set of calibration blocks 50 embodying the invention for calibrating the test equipment 10 so that the size and location of flaws 14 and the distance from the surface 18 of a body 12 being inspected, can be determined. Eight blocks 50 are shown in FIG. 2 and are divided into two groups of four each, designated in FIG. 2 as the a and b groups, respectively. Only one such group, however, is shown in FIG. 3.

Each block 50 preferably is cylindrical, that is, it has a circular cross-section. In addition, each block 50 has a relatively large flat surface 52 at one end while the other end of the block has a tapered portion 54 which terminates in a relatively small flat end surface 56. Where, as illustrated, each block 50 is generally cylindrical, the tapered portion 54 of the block is conical. The invention is not limited to any particular angle of taper for the tapered portion 54 of each block.

The end surfaces 52 and 56 of each block are flat and are parallel to each other and are spaced apart a precise distance. This distance or length of each block is designated at d1, d2, d3 and d4 for the blocks illustrated in FIG. 3. Also each small end surface 56 of a block 50 not only can be provided with a precise cross-sectional area or diameter but in addition the surface finish of the reflecting end surfaces 56 can readily be controlled so that each such surface has the same desired surface finish.

As illustrated, the length of each block 50 of group a differs from the length of the other blocks in this group and likewise the length of each block 50 of group b differs from the length of the other blocks in this group. In addition, each of the blocks 50 of the a group have small end surfaces 56 of the same diameter and each of the blocks 50 of the b group also have small end surfaces 56 of the same diameter but this latter diameter is larger than that for the blocks of the a group.

If the blocks illustrated in FIGS. 2 and 3 are used, for example, in calibrating the test equipment 10 for inspection of a body 12 having a thickness of over 6 inches, then for this purpose the blocks of both the a and b groups may be provided with lengths (that is, the distances between their surfaces 52 and 56) of 1-½ inches, 3 inches, 4-½ inches and 6 inches. In addition, the small end surfaces 56 of the a group of blocks 50 all have diameters of ⅛ inch and the small end surfaces of the b group of blocks all have diameters of ¼ inch.

In order to support the block 50 for actual use in calibrating the test equipment 10, each block 50 is fitted within a tubular sleeve 60 as shown in FIG. 3. Each sleeve 60 can be of any suitable material but a convenient material is a plastic sleeve which can be fitted about each block 50 by means of a shrink fit. As shown in FIG. 3, the sleeve 60 for each block 50 projects beyond the small end 56 of the block for protecting this end surface from the base or other supporting structure 62 on which the blocks are supported.

Figure 4:
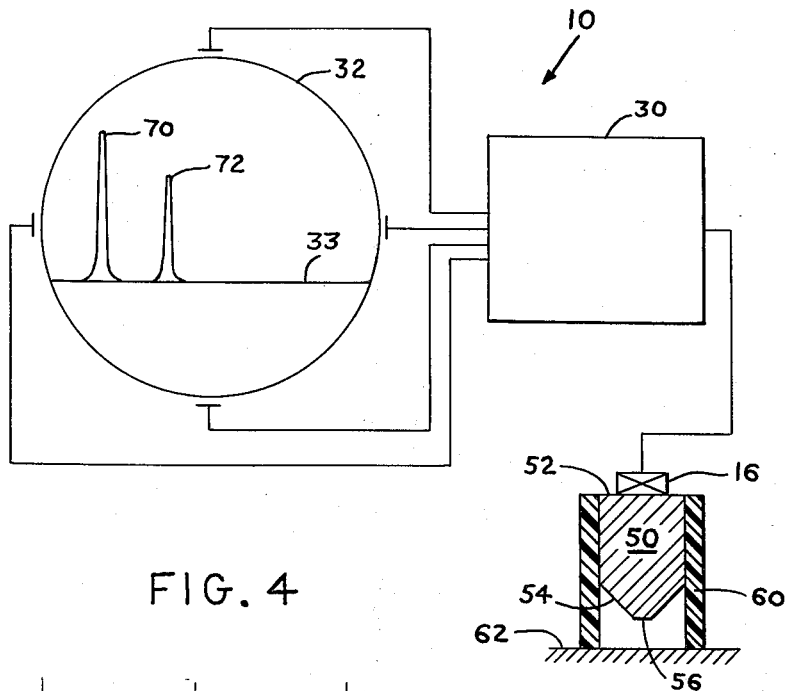
FIG. 4 is a view illustrating the ultrasonic flaw detection equipment being used with a calibration block.

FIG. 4 illustrates one of the a group (FIG. 2) of calibration blocks 50, that is, one having a reflecting end surface 56 of ⅛ inch in use with the test equipment 10. A sound beam of ultrasonic energy of the same intensity as to be used with a part to be inspected is sent into the block 50 from the transducer of the test equipment 10. The oscilloscope or cathode ray tube 32 of the test equipment now shows two pulses 70 and 72, the first pulse 70 represents the sound beam reflected from the large end surface 52 of the block 50 and the second pulse 72 represents the sound beam reflected from the small or reflecting end surface 50 of said block.

The distance between the pulses 70 and 72 as shown on the oscilloscope is the measure of the distance between the surfaces 52 and 56 of a particular calibrated block being used and the amplitude of the pulse 72 is a measure of the cross-sectional area of the small reflecting end surface 56.

Figure 5:
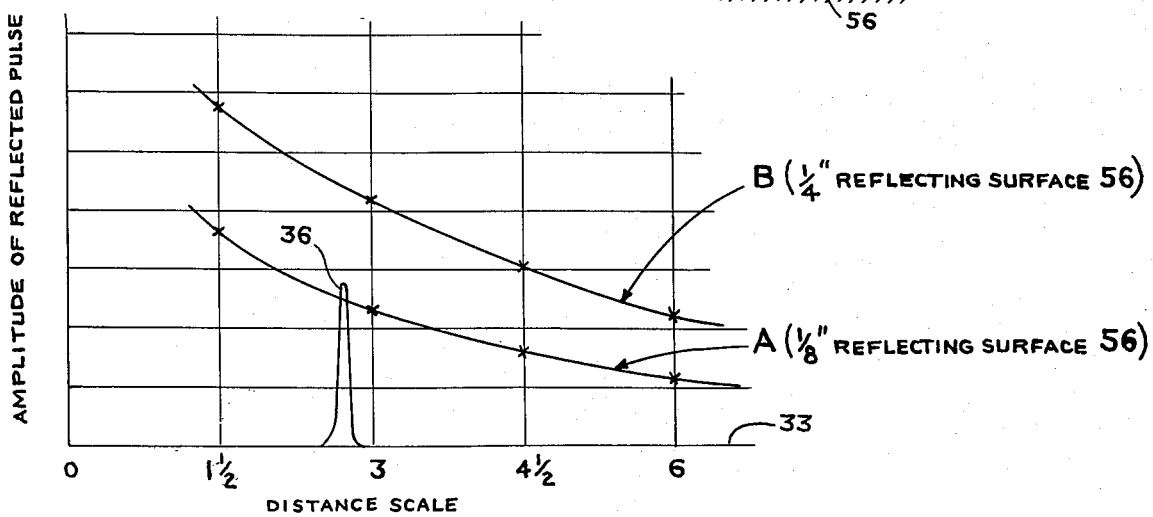
FIG. 5 is a graph illustrating typical calibration data obtained from use of calibration blocks of the invention and indicating the manner in which such data may be used for calibrating flaw detection test equipment so as to determine the size and location of flaws indicated by such equipment.

The tip of the pulse 72 is preferably plotted directly on the cathode ray tube 32, for example with a suitable crayon. The other calibration blocks 50 of the a group (FIG. 2), that is, those having the same ⅛ inch diameter reflecting end surfaces as the block 50 producing the pulse 72 in FIG. 4, are similarly used with the test equipment 10 with a sound beam of the same intensity as for the first block and the tips of the pulses reflected from the end surfaces 56 of each of these other blocks are each also plotted directly on the cathode ray tube 32. A curve A as shown in FIG. 5 is then drawn through the points so plotted to provide a distance-amplitude correction curve for reflecting surfaces of ⅛ inch diameter. For convenience of illustration the distance scale 33 in FIG. 5 has been increased from that shown in FIGS. 1 and 4 for the cathode ray tube 32.

If now the body 12 of FIG. 1 is inspected, the pulse 36 appearing on the cathode ray tube 32 (FIG. 1) and representing the flaw 14 in the body 12 will be superimposed on the curve A appearing on the tube as shown in FIG. 5. As illustrated in FIG. 5 the amplitude of the pulse 36 projects beyond the curve A thereby indicating that the flaw 14, as viewed in the direction of the sound beam 24, has an effective area corresponding to a circle having a diameter greater than ⅛ inch. In this way, when the ultrasonic flaw detecting test equipment 10 is used to test a body such as 12, the curve A on the cathode ray tube immediately indicates whether a particular flaw being detected has an effective diameter which is greater than or less than ⅛ inch.

Frequently the specifications for a particular part to be inspected for flaws only requires that it be free of hidden flaws or defects having a diameter greater than a specified magnitude, for example, ⅛ inch. In such a situation only one distance-amplitude correction curve such as A in FIG. 5 is necessary for inspection of the part and therefore only one set of blocks, such as the a group, having reflecting end surfaces 56 of said specified magnitude is required.

A more precise indication of the actual size of the flaws detected in a body such as 12 can be determined by plotting another distance-amplitude correction curve using another group of calibration blocks 50 but having reflecting end surfaces 56 of a different diameter from the group in which curve A was obtained. Thus, a second curve B is also shown on FIG. 5, this curve B having also been plotted on the cathode ray tube 32 from data obtained by using the *b* group of calibration blocks shown in FIG. 2, that is, by using calibration blocks having reflecting end surfaces of ¼ inch in diameter. It is clear now from curves A and B of FIG. 5 that the reflected pulse 36 from the defect 14 in the part 12 although having an effective diameter greater than ⅛ inch has an effective diameter of less than ¼ inch as viewed in the direction of the ultrasonic beam 24.

As described, the data from which the curves A and B of FIG. 5 were obtained preferably is plotted, for example, with a crayon directly on the cathode ray tube 32 providing the data. In addition, or in lieu of plotting this data on the cathode ray tube, it obviously may be transferred to and plotted on graph paper. Then in the case of the flaw 14 in the body 12, the tip of the pulse 36 reflected from this flaw is plotted on the graph for comparison with curves A and B.

The blocks 50 preferably should be of the same material as that of the body 12 being inspected by the equipment 10 so that the rate of travel and attenuation of sound waves traveling through the blocks 50 are the same as in the case of sound waves traveling through the body 12. This, however, is not absolutely essential to the use of the invention in that correction can be made for differences in the rate of travel or attenuation of sound waves through the blocks 50 as compared to that in a body 12 being inspected.

The number of blocks and the number of groups of such blocks having different small reflecting end surfaces 56 is not limited to that shown in FIG. 2. Preferably, the calibration blocks include at least one group each consisting of at least three blocks having different lengths between their surfaces 52 and 56 but having the same diameter reflecting end surfaces 56. However, for greater accuracy in determining the size of defects, two such groups of three blocks may be used with each group having the same diameter reflecting end surfaces 56 but with the diameter of the reflecting end surfaces of each group differing from that of the other group. For still greater accuracy and calibration of the equipment 10 for testing a given body 12, a set of blocks 50 may include a greater number than two such groups of blocks 50 with each group having the same diameter reflecting end surface but differing from the diameter of the end surface 56 of the blocks of the other groups and the number of blocks in each such group may include more than three blocks of different lengths.

The actual lengths of the various calibration blocks to be used in connection with the ultrasonic flaw detection in a particular body depends on the thickness of the material of the body and the size of their small reflecting end surfaces depends on the size of the flaws for which the body is to be inspected.

As already mentioned, the calibration blocks of the prior art consist of blocks having holes drilled into the blocks to desired depths. With such prior art construction of the calibration blocks it has proved difficult to make the bottom surface of each drilled hole both flat and parallel to the surface at the other end of the block. However, with the blocks 50 of the present invention the reflecting end surfaces 56 of the blocks can readily be made flat and parallel to the surface 52 at the other end of the blocks and in addition each reflecting end surface 56 can readily be provided with the desired surface finish.

While we have described our invention in detail in its present preferred embodiment, it is obvious to those skilled in the art after understanding our invention, that various changes and modifications may be made therein without departing from the spirit and scope thereof. We aim in the appended claims to cover all such modifications.

We claim:

1. A reference block for use in calibrating ultrasonic flaw detection test equipment, said block having a first relatively large flat surface at one end and through which ultrasonic energy is to be introduced into the block, the other end of said block being tapered to a relatively small flat surface at the extreme end of the block remote from said large end surface and being of prescribed cross-sectional area from which at least a substantial portion of said ultrasonic energy is to be reflected back to said large end surface, the two flat end surfaces of said block being parallel and being spaced apart a prescribed distance so that the block has a prescribed effective length.

2. A reference block as claimed in claim 1, in combination with a tubular member fitted about the portion of said block adjacent to its large end surface and having a portion projecting beyond said reflecting end so that said block may be supported by said projecting portion from a base structure with said reflecting end spaced from said base structure.

3. A reference block as claimed in claim 1 in which the portion of said block adjacent to its large end surface has a cylindrical cross-section and the tapered end of said block is conical.

4. A set of reference blocks for use in calibrating ultrasonic flaw detection test equipment, said set including at least three blocks each having a relatively large flat surface at one end and through which ultrasonic energy is to be introduced into the block with the other end of said block being tapered to a relatively small flat surface at the extreme end of the block remote from its large end surface, said small surface of each block being parallel to its larger end surface and from which at least a substantial portion of said ultrasonic energy is to be reflected back to said large end surface, said blocks having different lengths but having the same diameter reflecting end surfaces.

5. A set of reference blocks as claimed in claim 4 and including a second group of three blocks generally similar to the first mentioned three blocks but having reflecting end surfaces of different diameter from that of said first mentioned three blocks.

* * * * *